US 9,108,545 B2
(12) United States Patent
Maeda (10) Patent No.: US 9,108,545 B2
(45) Date of Patent: Aug. 18, 2015

(54) RECLINING APPARATUS

(71) Applicant: SHIROKI CORPORATION, Fujisawa-shi (JP)

(72) Inventor: Noriaki Maeda, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 138 days.

(21) Appl. No.: 13/831,044

(22) Filed: Mar. 14, 2013

(65) Prior Publication Data

US 2013/0264850 A1 Oct. 10, 2013

(30) Foreign Application Priority Data

Apr. 9, 2012 (JP) ................. 2012-088433

(51) Int. Cl.
*B60N 2/235* (2006.01)
*B60N 2/42* (2006.01)

(52) U.S. Cl.
CPC ............ *B60N 2/4228* (2013.01); *B60N 2/2356* (2013.01); *B60N 2/4221* (2013.01)

(58) Field of Classification Search
CPC ... B60N 2/2356; B60N 2/4221; B60N 2/4228
USPC .......................................... 297/367 R, 367 P
See application file for complete search history.

(56) References Cited

U.S. PATENT DOCUMENTS

| 7,195,318 B2 * | 3/2007 | Cha et al. ................... 297/367 R |
| 7,334,843 B2 * | 2/2008 | Yamada et al. ........... 297/367 R |
| 8,123,297 B2 * | 2/2012 | Quast et al. ............... 297/367 R |
| 8,708,412 B2 * | 4/2014 | Berndtson et al. ......... 297/367 P |
| 8,720,999 B2 * | 5/2014 | Peters ........................... 297/367 |

FOREIGN PATENT DOCUMENTS

JP 08-019442 A 1/1996

* cited by examiner

*Primary Examiner* — Anthony D Barfield
(74) *Attorney, Agent, or Firm* — McGinn Law Group, PLLC (57) ABSTRACT

A reclining apparatus includes: a base plate; a ratchet plate including a recessed portion having a inner circumferential surface provided with internal teeth; a pole including an outer circumferential surface of the pole provided with external teeth engageable with the internal teeth; and a guide, which is provided in the base plate to guide the pole between a locked position and an unlocked position, wherein the pole includes: a first cut external teeth part having a first tooth surface, in which a first side receiving a forward load is cut; and a second cut external teeth part having a second tooth surface, in which a second side receiving the rearward load is cut, and wherein a cutting degree of the first cut external teeth part is different from a cutting degree of the second cut external teeth part.

9 Claims, 6 Drawing Sheets

REARWARD LOAD ← → FORWARD LOAD

⟵ REAR    FRONT ⟶

FORWARD LOAD / REARWARD LOAD

⇐ FRONT    REAR ⇒

FIG.6

FORWARD LOAD    REARWARD LOAD

⇐ FRONT    REAR ⇒

FIG.7

FORWARD LOAD

FIG.8

REARWARD LOAD

RECLINING APPARATUS

CROSS-REFERENCE TO RELATED APPLICATION

This application claims priority from Japanese Patent Application No. 2012-088433 filed on Apr. 9, 2012, the entire subject matter of which is incorporated herein by reference.

TECHNICAL FIELD

This disclosure relates to a reclining apparatus which comes into a locked state when internal teeth and external teeth are engaged with each other.

BACKGROUND

Figure 9:
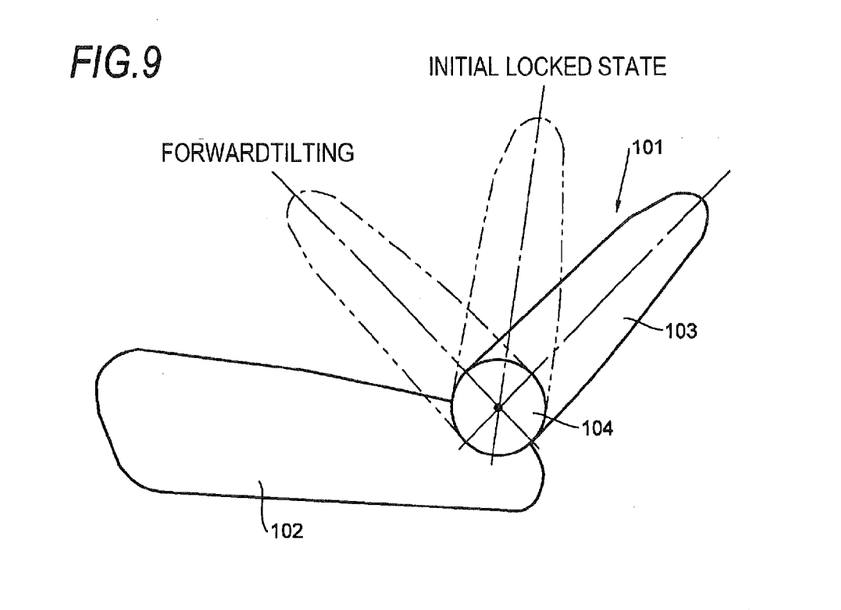
FIG. 9 is a view illustrating a configuration of a seat.
Figure 10:
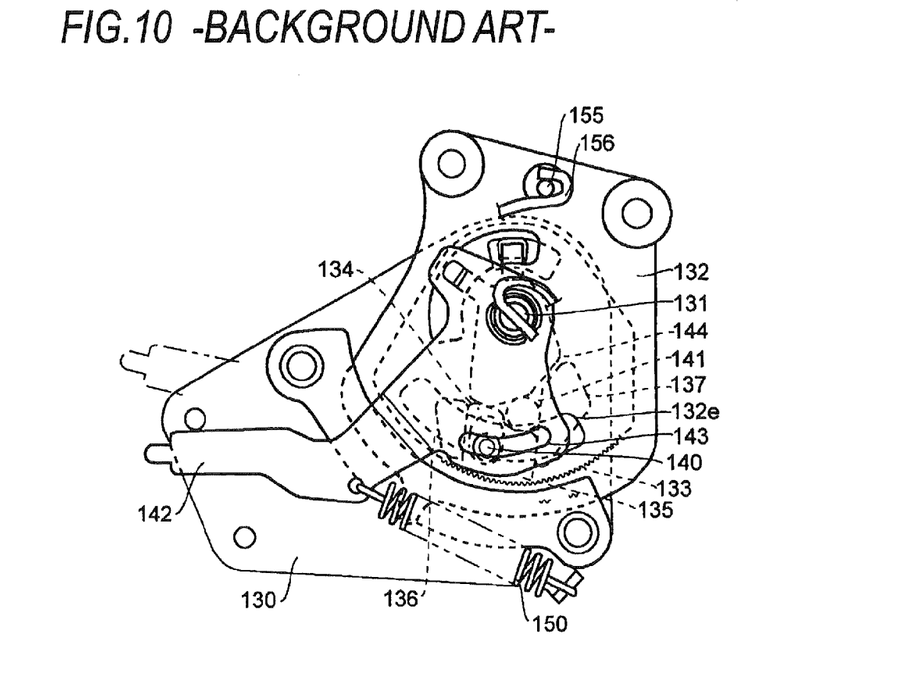
FIG. 10 is a side view illustrating a reclining apparatus for a vehicle seat according to the background art.

A reclining apparatus will be described with reference to FIGS. 9 and 10. FIG. 9 is a view illustrating a configuration of a seat and FIG. 10 is a side view of a reclining apparatus for a vehicle seat of the related art.

As shown in FIG. 9, a seat 101 includes a seat cushion 102, which supports the occupant's hip, and a seat-back 103 possible to be tilted in a front-back direction with respect to the seat cushion 102 and supports the occupant's back. A reference numeral 104 denotes a reclining apparatus which is provided on a tilt shaft of the seat-back 103, and it releases and restricts the tilting of the seat-back 103.

The reclining apparatus 104 will be described with reference to FIG. 10. In FIG. 10, a hinge pin 131 is provided to stand up from a lower arm plate (a second member) 130 which is attached to the rear side of a lower arm provided in the seat cushion. A ratchet plate 132, which is attached to an upper arm provided in the side of the seat-back, is rotatably provided around the hinge pin 131. A recess having a circular surface about the hinge pin 131 is provided at a lower portion of the ratchet plate 132, wherein the circular surface has a plurality of internal teeth 133 in its circumferential direction.

A pole 134 is disposed between the lower arm plate 130 and the ratchet plate 132. The pole 134 has a circular surface that faces the circular surface 132 of the ratchet plate 132 and has a plurality of external teeth 135 that are engageable with the internal teeth 133.

The lower arm plate 130 includes guides 136 and 137, which guide the pole 134 in a radial direction of a circle about the hinge pin 131 between a locked position where the external teeth 135 are engaged with the internal teeth 133 and an unlocked position where the external teeth 135 are not engaged with the internal teeth 133.

A release arm 142 is rotatably provided around the hinge pin 131 and has an elongate hole 143, which is engaged with a pin 140 of the pole 134 passing through a circular elongate hole 132e that is formed on the ratchet plate 132 about the hinge pin 131. The shape of the elongate hole 143 is configured to have parts close to and distant from the internal teeth 133 of the ratchet plate 132. Accordingly, the elongate hole is configured such that, as the release arm 142 turns, the pole 134 is moved in a radial direction of the circle about the hinge pin 131 so that the external teeth 135 of the pole 134 is engaged with or disengaged from the internal teeth 133 of the ratchet plate 132.

A first cam 144 is rotatably attached to the hinge pin 131.

A second cam 141 is provided between the first cam 144 and an inclined surface that is opposite side to the external teeth 135 of the pole 134. The inclined surface of the pole 134 is a surface that intersects with the radial direction of the circle.

The release arm 142 is urged with an urging force in a direction, toward which the first cam 144 urges the pole 134 via the second cam 141 by a spring 150. The spring 150 is an urging means having one end portion engaged to the release arm 142 and the other end portion engaged to the lower arm plate 130.

The hinge pin 131 is formed on its end surface with a groove in which an inner end portion of a spiral spring 156 is engaged, wherein an outer end portion of the spiral spring 156 is engaged with a pin 155 having an outer end portion standing up from the ratchet plate 132, so that the ratchet plate 132 (the upper arm) is urged in a forward tilting direction.

Hereinafter, the operation of the above configuration will now be described. FIG. 10 shows a locked state where the first cam 144 presses the pole 134 down via the second cam 141, which comes into contact with the inclined surface of the first cam 144, the guide 137 and the pole 134, respectively, so that the external teeth 135 of the pole 134 is engaged with the internal teeth 133 of the ratchet plate 133 to restrict the turning of the ratchet plate 132, so that the reclining (tilting) of the seat-back 103 is to be the locked state.

In this state, when the release arm 142 that is located at a position depicted by a solid line is turned, against the urging force of the spring 150, to the position depicted by a dashed-two dotted line, the first cam 144 engaged with the release arm 142 is turned in the same direction, thereby releasing the state where the first cam 144 is pressing the pole down via the second cam 141.

Further, the pole 134 having the pin 140 which is engaged to the elongate hole 143 of the release arm 142 is also guided to the guides 136 and 137 and then is moved in the direction of the hinge pin 131. This releases the engaged state of the external teeth 135 of the pole 134 and the internal teeth 133 of the ratchet plate 132 (an unlocked state), so that the ratchet plate 132 (the seat-back 103) comes into a tiltable state.

An occupant releases a manipulating force of the release arm 142 when tilting a desired seat-back 103 to a desired tilting angle. Then, the release arm 142 returns to the position of solid line from the position of dashed-two dotted line by the urging force of the spring 150, allowing the first cam 144 to turn in the opposite direction, and to thus return to the state of FIG. 10 (see e.g. JP-A-H08-019442).

SUMMARY

In the reclining apparatus shown in FIGS. 9 and 10, when a vehicle collides from behind, occupant's load is applied to the seat-back (ratchet plate). The load is transmitted to a floor of the vehicle via the ratchet plate (internal teeth), the pole (external teeth), and the lower arm plate in that order. Accordingly, the internal and external teeth require engagement force (reclining strength) that can bear the load applied to the seat-back.

In the seat-back of the reclining apparatus shown in FIG. 9, the seat-back is applied with load such as the urging force by the spiral spring in the forward tilting direction, backward load of an occupant or the like, so that the engaged portion of the internal and external teeth is applied with the load of the internal and external teeth in the engagement direction and the load of the seat-back in the forward or rearward tilting direction. Accordingly, when the reclining apparatus is unlocked, a manipulating force increases or unlocking noise may be generated due to the load from the seat-back.

The unlocking noise may be mitigated by laying the tooth surfaces of the internal and external teeth, so that a component of force of the pole in the moving direction is increased and thus a disengagement feature of the pole is improved. However, when the internal and external teeth are laid on the side, the engaging strength thereof may be degraded.

Accordingly, this disclosure has been made with taking into the consideration the above, and this disclosure provides at least a reclining apparatus capable of maintaining a balance between the reclining strength and a reduction in the unlocking noise.

In view of the above, a reclining apparatus of this disclosure comprise: a base plate, which is provided on one of a seat cushion and a seat-back; a ratchet plate, which is provided on the other of the seat cushion and the seat-back and is rotatably provided with respect to the base plate, wherein the ratchet plate includes a recessed portion having a inner circumferential surface about a rotation axis so as to face the base plate, and the inner circumferential surface of the recessed portion is provided with internal teeth; a pole, which is provided in the recessed portion of the ratchet plate, wherein an outer circumferential surface of the pole is provided with external teeth engageable with the internal teeth; and a guide, which is provided in the base plate to guide the pole between a locked position, in which the external teeth of the pole are engaged with the internal teeth of the ratchet plate, and an unlocked position, in which the external teeth of the pole are not engaged with the internal teeth of the latched plate. The pole comprises: a first cut external teeth part including at least one first cut external tooth having a first tooth surface, in which a first side receiving a forward load for urging the seat-back to fall forward is cut; and a second cut external teeth part including at least one second cut external tooth having a second tooth surface, in which a second side receiving the rearward load for urging the seat-back to fall rearward is cut. Then, a cutting degree of the first cut external teeth part is different from a cutting degree of the second cut external teeth part.

Meanwhile, the term 'tooth surface' used in the specification means a surface where internal teeth and external teeth are engaged with each other.

According to this disclosure, the pole is provided with first and second cut external teeth parts, wherein the first cut external teeth part has at least one first cut external tooth having a cut tooth surface to which, when forward falling load is applied to the seat-back, the forward falling load is applied, and the second cut external teeth part has at least one second cut external tooth having a cut tooth surface to which, when rearward falling load is applied to the seat-back, the rearward falling load is applied. Thus, the cut tooth surfaces of the first and second cut external teeth parts further lay on the sides, compared to those of the other normal external teeth parts, so that the unlocking noise is reduced.

Generally, a reclining apparatus requires the reclining strength enough to resist against the rear load applied when a vehicle collides from behind.

According to this disclosure, when the first and second cut external teeth are cut to have different degrees, for instance, when a cutting degree of the second cut external tooth surface, to which rear load is applied, is less that to a cutting degree of the first cut external tooth surface, the second cut external teeth have increased engaging strength on internal teeth compared to that of the first cut external teeth. That is, although the first cut external teeth have lower engaging strength compared to the second cut external teeth, a disengaging feature of the pole is improved. On the contrary, although the second cut external teeth have higher engaging strength compared to the first cut external teeth, the disengaging feature of the pole is degraded. As the cutting degree of the first and second cut external teeth is appropriately set, an appropriate balance between the reclining strength (engaging strength) and a reduction in the unlocking noise is achieved.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

An illustrative embodiment of this disclosure will now be described with reference to the accompanying drawings.

[Entire Configuration]

Figure 1:
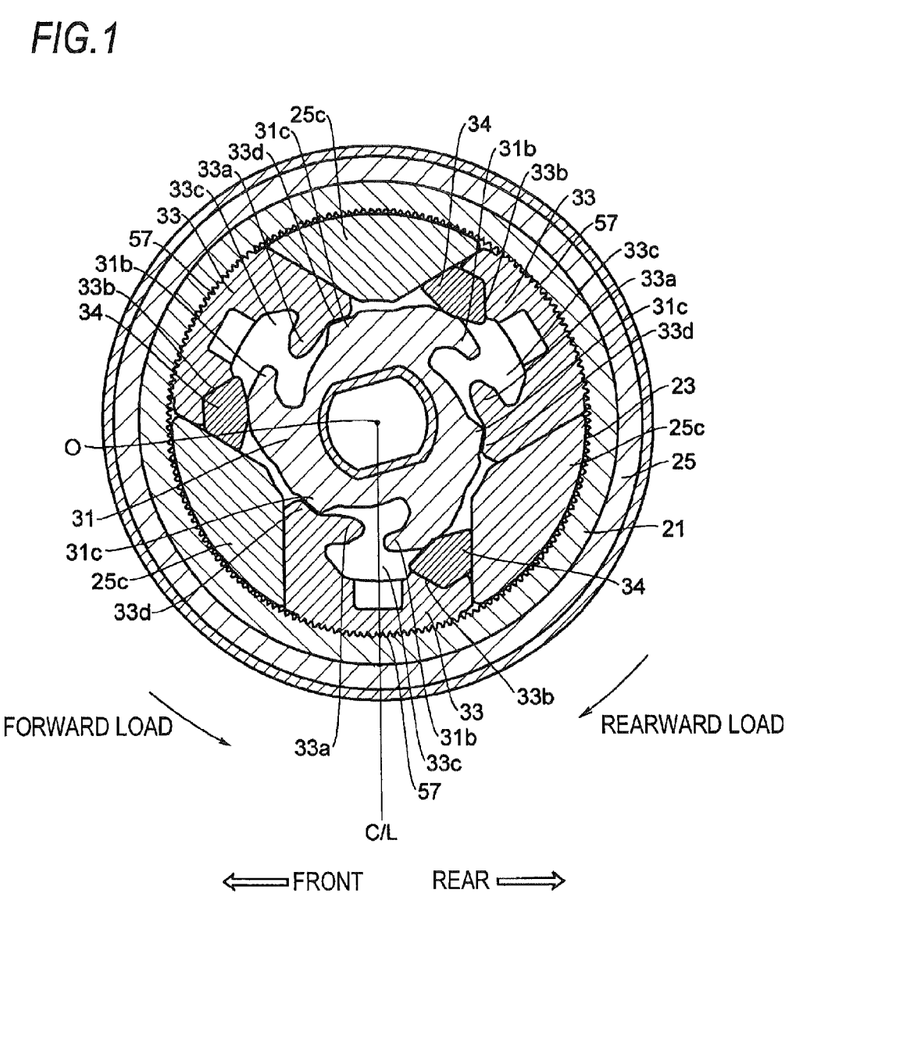
FIG. 1 is a sectional view taken along a line I-I of FIG. 4, illustrating main components of a reclining apparatus, in which a pole is in a locked state, according to an illustrative embodiment.
Figure 2:
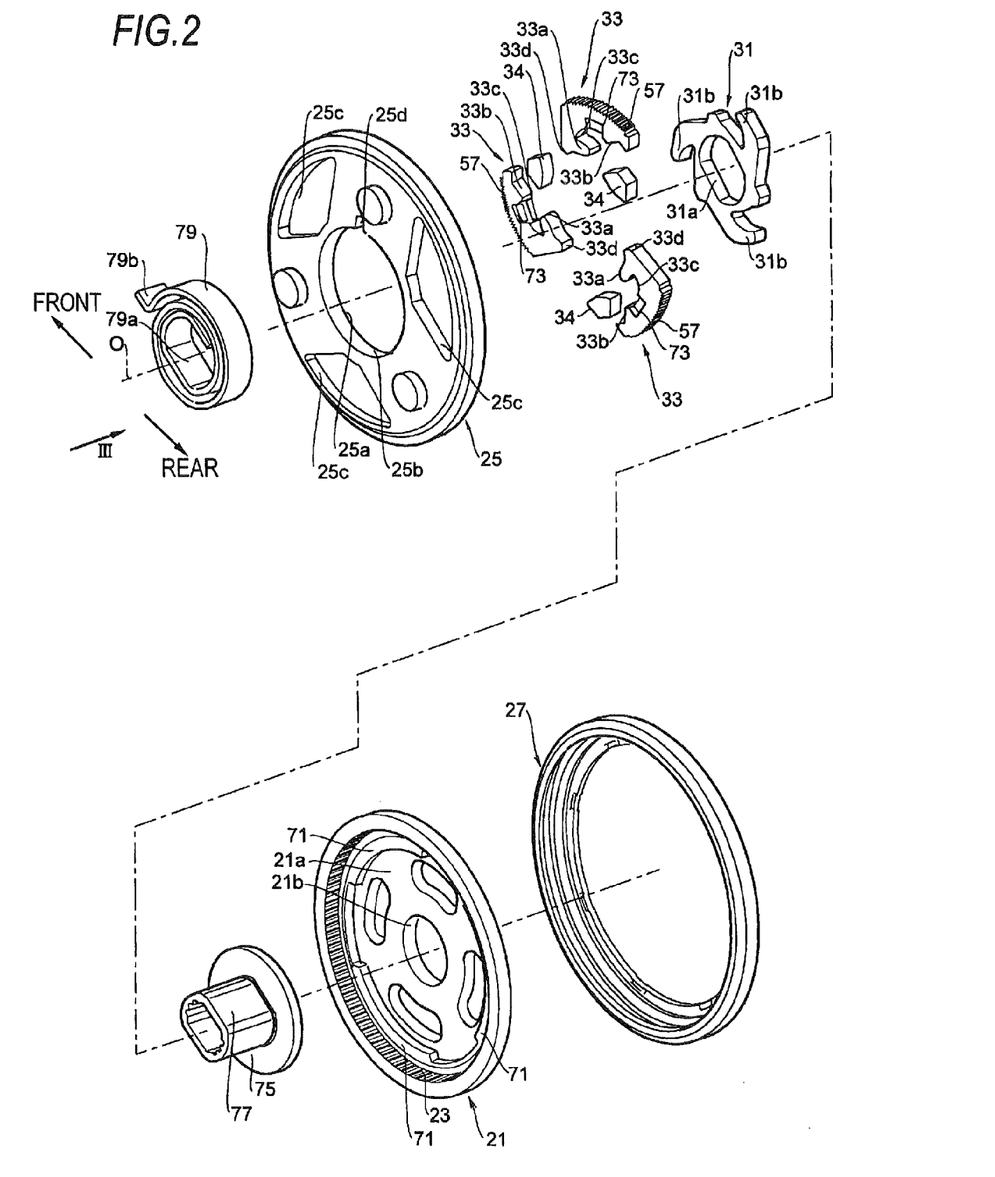
FIG. 2 is an exploded perspective view of the reclining apparatus according to the illustrative embodiment.
Figure 3:
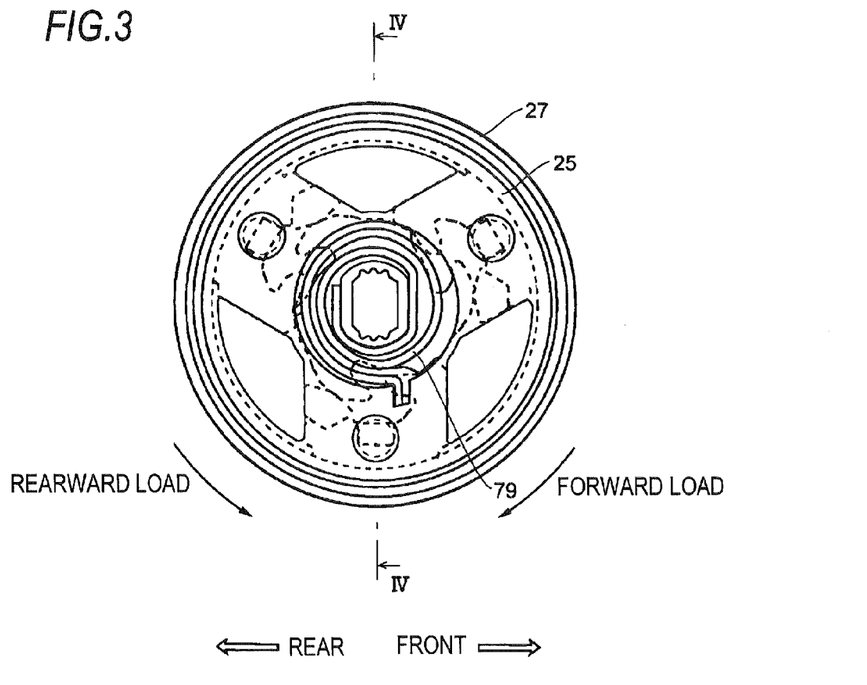
FIG. 3 is a view of a ratchet shown in FIG. 2 as viewed in the direction of the arrow III.
Figure 4:
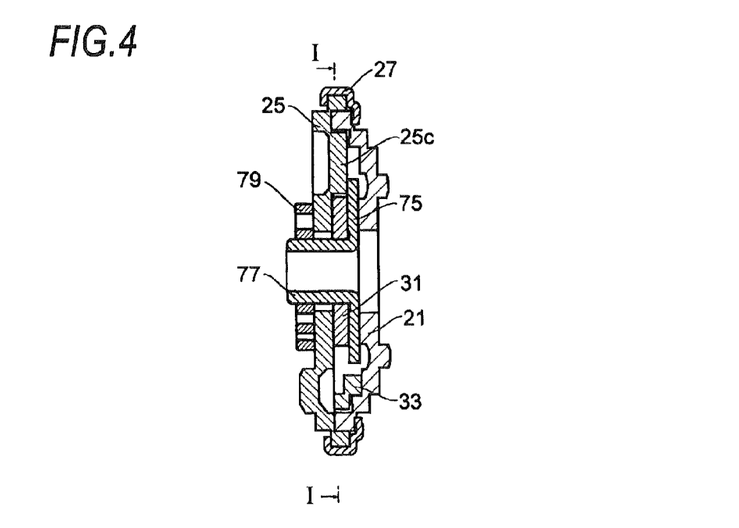
FIG. 4 is a sectional view taken along a line IV-IV of FIG. 3.
Figure 5:
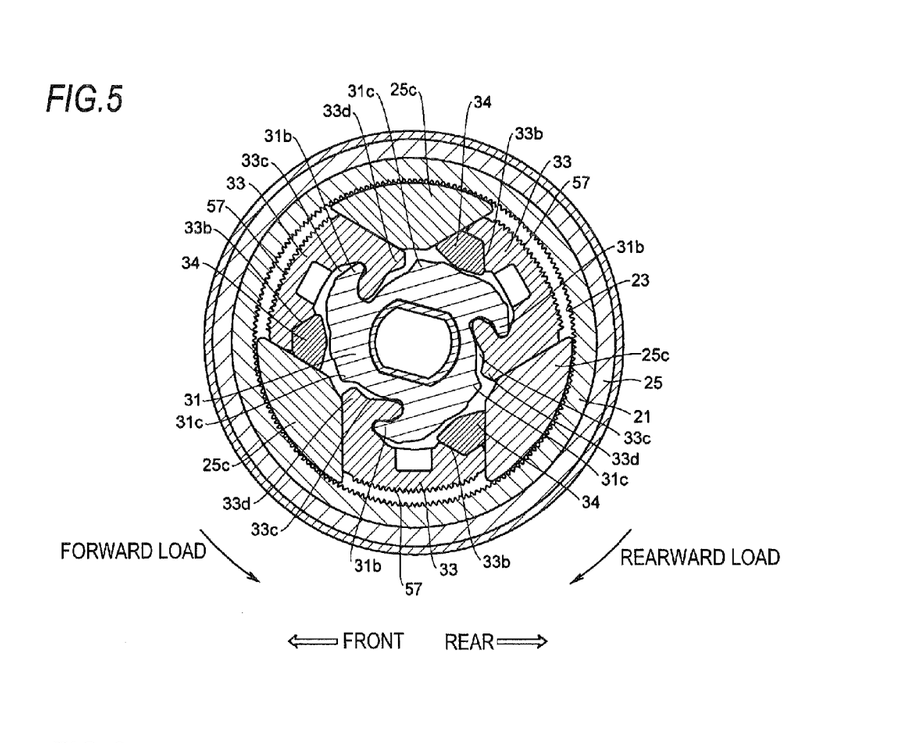
FIG. 5 is a view illustrating a full-open state (where the pole is in an unlocked state) which is changed from the state of FIG. 1.

The entire configuration of a reclining apparatus according to an illustrative embodiment will be described with reference to FIGS. 1 to 5. FIG. 1 is a sectional view taken along a line I-I of FIG. 4, illustrating main components of a reclining apparatus, in which wherein a pole is in a locked state, according to an illustrative embodiment. FIG. 2 is an exploded perspective view of the reclining apparatus according to the illustrative embodiment. FIG. 3 is a view of a ratchet shown in FIG. 2 as viewed in the direction of the arrow III. FIG. 4 is a sectional view taken along a line IV-IV of FIG. 3. FIG. 5 is a view illustrating a full-open state (where the pole is in an unlocked state) which is changed from the state of FIG. 1.

Similarly to the reclining apparatus 104 shown in FIG. 9, the reclining apparatus of the illustrative embodiment is provided on a tilt shaft of a seat-back 103. The seat-back is urged in the forward tilting direction. In FIGS. 1 to 3, and FIG. 5, the front and rear sides of a vehicle are indicated by arrows.

In FIG. 2, a ratchet plate 21 is provided on the side of the seat-back. The ratchet plate 21 is formed by half-blanking of a disk-shaped plate member to have a cylindrical shape with a bottom portion 21a and an opening opposite to the bottom portion 21a. Internal teeth 23 are formed along a whole inner surface (circumferential surface) of the cylinder with the bottom portion (recess) of the ratchet plate 21. In addition, the bottom portion 21a has a through-hole 21b at a center thereof.

A base plate 25 is provided on the side of a seat cushion. The base plate 25 is also formed by half-blanking a disk-type plate member to have a cylindrical shape with a bottom portion 25a and an opening opposite to the bottom portion 25a. A diameter of the bottom portion 25a of the cylinder is set to be slightly larger than an outer diameter of the ratchet plate 21. The ratchet plate 21 is fitted into the bottom portion 25a, and the ratchet plate 21 can rotate relative to a base plate 25. The base plate 25 has a through-hole 25b at a center thereof.

As shown in FIG. 4, an outer circumference of the ratchet plate 21 and an outer circumference of the base plate 25 are supported by an outer ring 27, and the ratchet plate 21 and the base plate 25 are relatively rotatable without being separated from each other in a direction of an axis (O in FIG. 2) of relative-rotation.

Returning to FIG. 2, a rotary cam (a first cam) 31 is disposed in a space defined by the bottom portions 21a, 25a of the ratchet plate 21 and the base plate 25. The rotary cam 31 has a through-hole 31a at a center thereof, which is of a non-circular (oval) shape.

In addition, three poles 33 are disposed on the outside of the rotary cam 31 in a space defined by the bottom portions 21a, 25a of the ratchet plate 21 and the base plate 25. Each of the poles 33 has a plurality of external teeth 57 that are engageable with the internal teeth 23.

As show in FIG. 1, the base plate 25 is provided with guides 25c which guide the respective poles 33 in the radial direction of the axis of relative-rotation. Accordingly, the respective poles 33 are movable in the radial direction of the axis of relative-rotation.

A cam (a second cam) 34 is disposed between the pole 33, the rotary cam 31, and the guides 25c.

Returning to FIG. 2, each of the poles 33 is provided, on the opposite side to the surface on which the external teeth 57 are formed, with a recessed part 33c and a hook part 33a which extend in a direction intersecting with the radial direction of the axis of relative-rotation. The hook parts 33a are formed in the forward direction (in one direction) about a radial line (a C/L line in FIG. 1) leading through a center of the external teeth 57.

A circumference of the rotary cam 31 is provided with three hook parts 31b capable of meshing with the recessed parts 33c of the respective poles 33. Further, each of the poles 33 is provided, on the opposite side to the surface on which the external teeth 57 are formed, with a locking surface 33b with which the cam 34 capable of coming into contact. The locking surface 33b intersects with the radial direction of the axis of relative-rotation, and, when it is pressed by the cam 34, it generate a force to urge the pole 33 toward the guide 25c and a force to move the pole 33 in the direction, toward which the external teeth 57 are engaged with the internal teeth 23 (in the radial direction of the axis of relative-rotation).

Further, the hook part 33a of the pole 33 is provided with a rotary cam contact part 33d with which a cam contact part 31c of the rotary cam 31, which is formed on the portion other than the hook part 31b, capable of coming into contact.

As shown in FIG. 1, when the rotary cam 31 rotates in one direction (in a counterclockwise direction in FIG. 1), the hook part 31b of the rotary cam 31 presses against the cam 34, and then the cam 34 presses against the guide 25c and the locking surface 33b of the pole 33 to move the pole 33 in the direction away from the axis of relative-rotation, thereby coming into a locked position where the external teeth 57 of the pole 33 are engaged with the internal teeth 23 of the ratchet plate 21.

Here, a gap is created between the cam contact part 31c of the rotary cam 31 and the rotary cam contact part 33d of the pole 33.

In the present illustrative embodiment, an unlocked state-holding mechanism includes three circular guides 71 that are formed on an inner circumferential surface a side of the bottom portion 21a than the internal teeth 23 of the ratchet plate 21, and protrusions 73 that are formed on respective surfaces of the poles 33 facing the bottom portion 21a of the ratchet plate 21 by a half-blanking process.

Therefore, when the protrusion 73 of each pole 33 comes into contact with the circular guide 71, the pole 33 is held at an unlocked position where the external teeth 57 are not engaged with the internal teeth 23 of the ratchet plate 21.

An operating shaft 77 having a non-circular (oval) sectional shape is fitted into the non-circular through-hole 31a of the rotary cam 31 and rotates integrally with the rotary cam 31. The operating shaft 77 is provided, on the entire circumference thereof, with a flange 75 that radially protrudes from the operating shaft 77 to contact with the bottom portion 21a of the ratchet plate 21, so that the flange serves to suppress the operating shaft 77 from tilting in any direction relative to the bottom portion 21a of the ratchet plate 21.

The operating shaft 77 has a height to be exposed outwards from the through-hole 25b of the base plate 25.

A spiral spring 79 as an urging unit, which is formed by machining a lengthy leaf plate into a spiral form, is disposed in the through-hole 25b of the base plate 25. An inner end part 79a of the spiral spring 79 is wound and held around the operating shaft 77, and an outer end part 79b of the spiral spring 79 is fitted into a notch 25d which is formed on a circumference of the through-hole 25b of the base plate 25. The urging force of the spiral spring 79 acts on the rotary cam 31 to urge the pole 33 towards a locked position.

Here, the operation of the reclining apparatus of the illustrative embodiment will now be described.

As shown in FIG. 1, when the operating force is not applied to the rotary cam 31, the rotary cam 31 rotates in one direction (in a counterclockwise direction in FIG. 1) by the urging force of the spiral spring 79, and press the hook part 31b of the rotary cam 31 against the locking surface 33b of the pole 33 via the cam 34. As described above, when the locking surface 33b of the pole 33 is pressed, a force to urge the pole 33 toward the guide 25c and a force to move the pole 33 in a direction, toward which the external teeth 57 are engaged with the internal teeth 23 (in the radial direction of the axis of relative-rotation) are generated, and then the pole 33 is located locked position where the external teeth 57 of the pole 33 are engaged with the internal teeth 23 of the ratchet plate 21. Accordingly, the relative rotation between the ratchet plate 21 and the base plate 25 is restricted, so that the seat-back is not rotatable relative to the seat cushion (i.e., a locked position). Further, the force to urge the pole 33 towards the guide 25c is generated, so that the rattling between the pole 33 and the guide 25c is suppressed.

In the case where the pole 33 is in the locked position, when the rotary cam 31 (the operating shaft 77) rotates in the reverse direction (in the clockwise direction in FIG. 1) against the urging force of the spiral spring 79, the hook part 31b of the rotary cam 31 enters the recessed part 33c of the pole 33 and then engages with the hook part 33a of the pole 33 (that is, presses against an inner wall surface of the recessed part 33c on the side of the center of relative rotation). Then, the pole 33 is lifted in the direction to be closed to the axis of relative rotation, and comes into an unlocked position (a full-open state) as shown in FIG. 5, in which the external teeth 57 of the pole 33 are not engaged with the internal teeth 23 of the ratchet plate 21. Accordingly, the ratchet plate 21 and the base plate 25 are rotatable relative to each other, so the seat-back can rotate relative to the seat cushion.

[Details of the External Teeth of the Pole]

Figure 6:
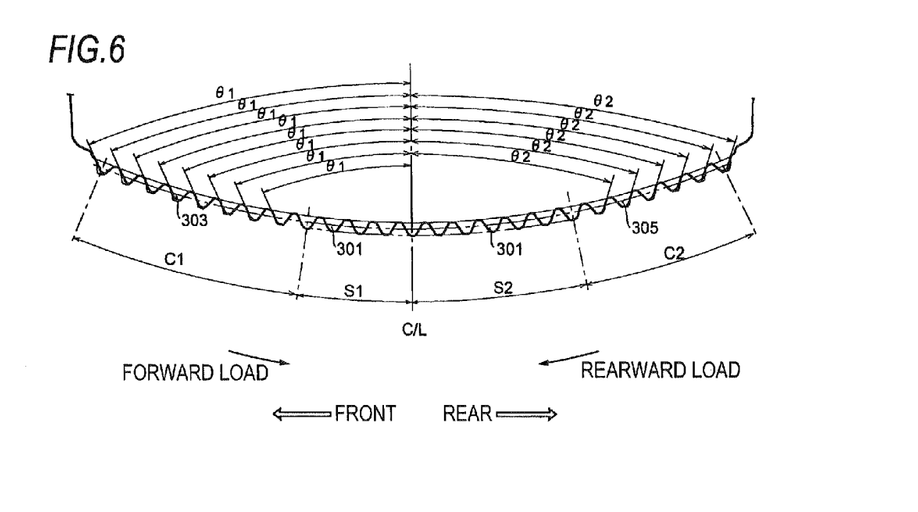
FIG. 6 is a view illustrating external teeth of the pole shown in FIG. 1.
Figure 7:
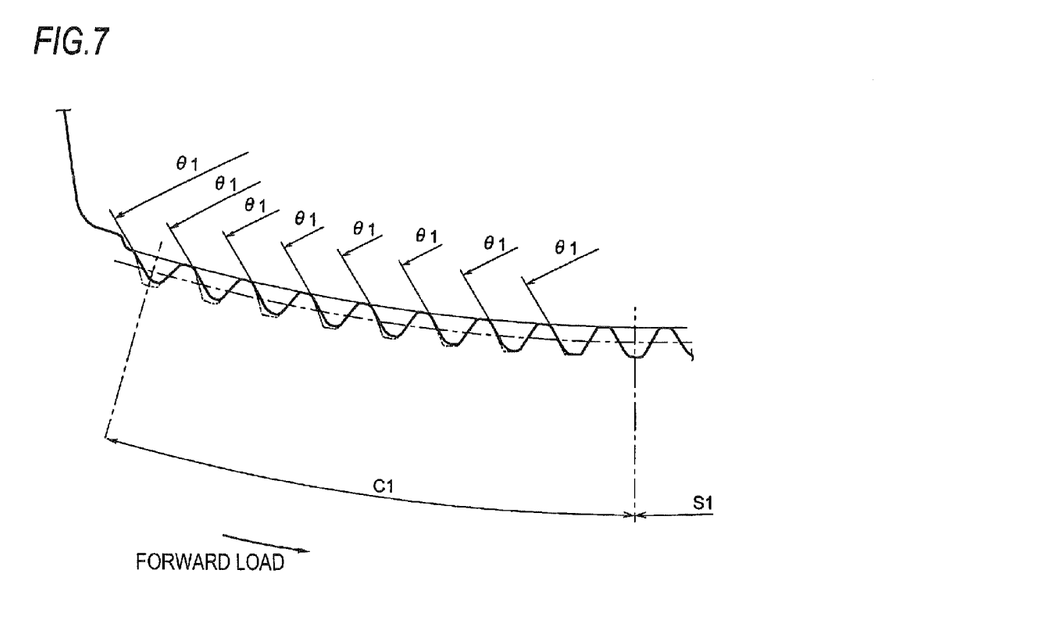
FIG. 7 is a view illustrating first cut external teeth shown in FIG. 6.
Figure 8:
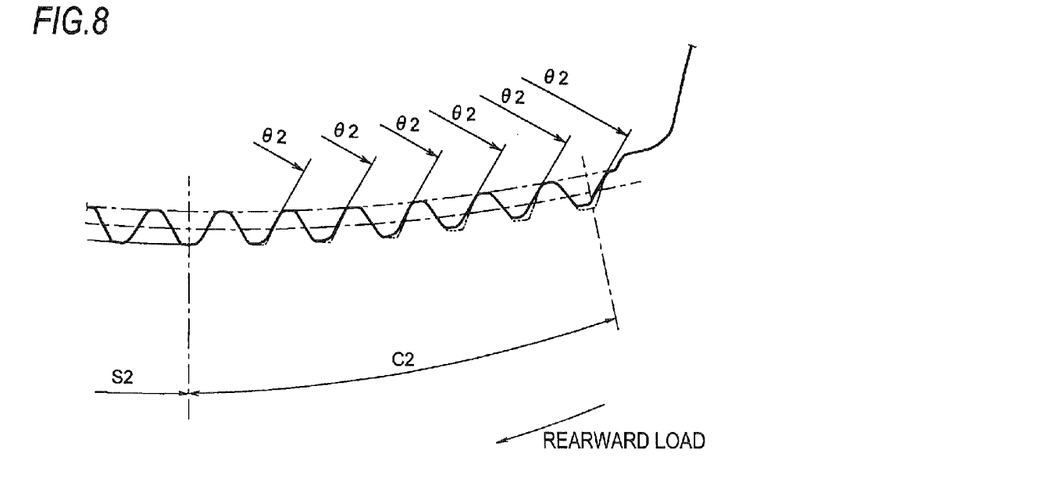
FIG. 8 is a view illustrating second cut external teeth shown in FIG. 6.

Hereinafter, the shape of the external teeth 57 of the pole 33 will be described with reference to FIGS. 6 to 8. FIG. 6 is a view illustrating the external teeth of the pole shown in FIG. 1. FIG. 7 is a view illustrating first cut external teeth shown in FIG. 6. FIG. 8 is a view illustrating second cut external teeth shown in FIG. 6.

As shown in FIG. 6, in the forward side (first side) of a radial line (a C/L line) leading through a center of the external teeth 57 of the pole 33, the external teeth 57 of the pole 33 includes a first normal external teeth part S1 having a plurality of normal external teeth 301, and a first cut external teeth part C1 having first cut external teeth 303, in that order from the C/L line. Each of the normal external teeth 301 has an uncut tooth surface that is not cut, and each of the first cut external teeth 303 has a cut tooth surface that is cut. Here, the cut tooth surfaces of the first cut external teeth 303 are a surface to which the forward falling load is applied when a forward falling load is applied to a seat-back in the direction toward which the seat-back falls forward (FIG. 1).

Further, on the rearward side (second side) of the radial line (the C/L line) leading through the center of the external teeth 57 of the pole 33, the external teeth 57 of the pole 33 includes a second normal external teeth part S2 having a plurality of normal external teeth 301, and a second cut external teeth part C2 having second cut external teeth 305, in that order from the C/L line. Each of the normal external teeth 301 has an uncut tooth surface that is not cut, and each of the second cut external teeth 305 has a cut tooth surface that is cut. Here, the cut tooth surfaces of the second cut external teeth 305 are a surface to which the rearward falling load is applied, when a rearward falling load is applied to the seat-back in the direction toward which the seat-back falls rearward.

The forward load is generated when the seat-back is urged in the forward tilting direction. The rearward load is generated when an occupant pushes his back against the seat-back. The largest rearward load is generated when a vehicle collides from behind. Accordingly, the reclining apparatus requires the reclining strength enough to resist against the rearward load generated at the rear-end collision of a vehicle.

In the present illustrative embodiment, the first cut external teeth 303 have 8 teeth, and the second cut external teeth 305 have 6 teeth.

With respect of the radial line (the C/L line) leading through the center of external teeth 57 of the pole 33, the cut tooth surfaces of the first cut external teeth 303 are defined at an angle θ1, the cut tooth surfaces of the second cut external teeth 305 are defined at an angle θ2, and the angle θ1 is larger than the angle θ2 (θ1>θ2).

According to the above configuration, following effects will be achieved.

According to the pole with first cut external teeth 303 and the second cut external teeth 305 whose tooth surfaces are cut, these teeth faces laid down compared to the normal (standard) external teeth 301, so that unlocking noise is alleviated.

(2) According to the above description, the first cut external teeth 303 of the first cut external teeth part C1 have 8 teeth, and the second cut external teeth 305 of the second cut external teeth part C2 have 6 teeth. Further, with respect of the radial line (the C/L line) leading through the center of external teeth 57 of the pole 33, the cut tooth surfaces of the first cut external teeth 303 are defined at an angle θ1, the cut tooth surfaces of the second cut external teeth 305 are defined at an angle θ2, and the angle θ1 is larger than the angle θ2 (θ1>θ2).

That is, the cutting degrees of the tooth surfaces of the first cut external teeth 303 and second cut external teeth 305 are different from each other, and the second cut external teeth 305 have higher engaging strength on the internal teeth 23, compared to that of the first cut external teeth 303. That is, although the first cut external teeth 303 have lower engaging strength compared to the second cut external teeth 305, the disengaging feature of the pole 33 is good. On the contrary, although the second cut external teeth 305 have higher engaging strength compared to the first cut external teeth 303, the disengaging feature of the pole 33 is low.

According to the above description, on a first side of the radial line (the C/L line) leading through the center of the external teeth 57 of the pole 33, the first cut external teeth part C1 having the first cut external teeth 303 are formed. Accordingly, when the pole is unlocked, unlocking force of the rotary cam (the first cam) 31 is applied to the first side of the pole 33.

According to the above description, on a second side of the radial line (the C/L line) leading through the center of the external teeth 57 of the pole 33, the second cut external teeth part C2 having the second cut external teeth 305 are formed. Accordingly, when the pole is locked, locking force of the cam (the second cam) 34 is applied to the pole.

As the cutting degree of the first cut external teeth 303 of the first cut external teeth part C1 and the second cut external teeth 305 of second cut external teeth part C2 is appropriately set, an appropriate balance between the reclining strength (engaging strength) and a reduction in the unlocking noise is achieved.

This disclosure is not limited to the above-mentioned illustrative embodiments. In the above illustrative embodiment, the ratchet plate 21 is provided on a side of the seat-back, and the base plate 25 is provided on a side of the seat cushion. Alternatively, the ratchet plate 21 may be provided on the side of the seat cushion and the base plate 25 may be provided on the side of the seat-back.

Further, in the above illustrative embodiment, the seat-back is urged in the forward tilting direction, this disclosure is applicable to the seat whose seat-back is not urged in the forward direction.

In the above configuration, in order to change the cutting degree of the first and second cur external teeth parts C1 and C2, both an angle between the cut tooth surfaces and the radial line (the C/L line) leading through the center of external teeth 57 of the pole 33 and the number of the external teeth whose tooth surfaces are cut may be modified. However, only the angle between the cut tooth surfaces and the radial line (the C/L line) leading through the center of external teeth 57 of the pole 33 may be changed, while maintaining the same number of the cut tooth surfaces. Alternatively, only the number of the cut tooth surfaces may be changed, while maintaining the same angle between the cut tooth surfaces and the radial line (the C/L line) leading through the center of external teeth 57 of the pole 33.

Further, either one of the first cut external teeth part C1 and the second cut external teeth part C2 may be formed.

What is claimed is:

1. A reclining apparatus comprising:
   a base plate, which is provided on one of a seat cushion and a seat-back;
   a ratchet plate, which is provided on the other of the seat cushion and the seat-back and is rotatably provided with respect to the base plate, wherein the ratchet plate includes a recessed portion having an inner circumferential surface about a rotation axis so as to face the base plate, and the inner circumferential surface of the recessed portion is provided with internal teeth;
   a pawl, which is provided in the recessed portion of the ratchet plate, wherein an outer circumferential surface of the pawl is provided with external teeth engageable with the internal teeth; and
   a guide, which is provided in the base plate to guide the pawl between a locked position, in which the external teeth of the pawl are engaged with the internal teeth of the ratchet plate, and an unlocked position, in which the external teeth of the pawl are not engaged with the internal teeth of the latched plate, wherein the pawl comprises:
- a first cut external teeth part including at least one first cut external tooth having a first tooth surface, in which a first side receiving a forward load for urging the seat-back to fall forward is cut; and
- a second cut external teeth part including at least one second cut external tooth having a second tooth surface, in which a second side receiving a rearward load for urging the seat-back to fall rearward is cut, and wherein a cutting degree of the first cut external teeth part is different from a cutting degree of the second cut external teeth part.

2. The reclining apparatus according to claim 1,
wherein the cutting degree of the first cut external teeth corresponds to an angle between the first tooth surface and a radial line leading through a center of the external teeth of the pawl, and
wherein the cutting degree of the second cut external teeth corresponds to an angle between the second tooth surface and the radial line.

3. The reclining apparatus according to claim 1,
wherein the cutting degree of the first cut external teeth part corresponds to a number of the first cut external teeth; and
wherein the cutting degree of the second cut external teeth part corresponds to a number of the second cut external teeth.

4. The reclining apparatus according to claim 1,
wherein the first cut external teeth part is provided at a first side of the pawl with respect to a radial line leading through a center of the external teeth, and
wherein the second cut external teeth part is provided at a second side of the pawl, which is different from the first side of the pawl, with respect to the radial line leading through the center of the external teeth.

5. The reclining apparatus according to claim 1, further comprising:
- a first cam, which is provided to a side opposite to the outer circumferential surface of the pawl;
- a second cam, which is provided between the first cam and the pawl, wherein the first cam is configured to engage with a first side of the pawl with respect to a radial line leading through the center of external teeth to move the pawl to an unlocked position, and
wherein, when the second cam is pressed by the first cam, the second cam is configured to press a second side of the pawl with respect to the radial line such that pawl is urged toward the guide so as to move in a direction, toward which the external teeth are engaged with the internal teeth.

6. A reclining apparatus comprising:
a base plate, which is provided on one of a seat cushion and a seat-back;
a ratchet plate, which is provided on the other of the seat cushion and the seat-back and is rotatably provided with respect to the base plate, wherein the ratchet plate includes a recessed portion having an inner circumferential surface about a rotation axis so as to face the base plate, and the inner circumferential surface of the recessed portion is provided with internal teeth;
a pawl, which is provided in the recessed portion of the ratchet plate, wherein an outer circumferential surface of the pawl is provided with external teeth engageable with the internal teeth; and
a guide, which is provided in the base plate to guide the pawl between a locked position, where the external teeth of the pawl are engaged with the internal teeth of the ratchet plate, and an unlocked position, where the external teeth of the pawl are not engaged with the internal teeth of the latched plate, wherein the pawl comprises a cut external teeth part having either one of a first tooth surface, in which a first side receives a forward load for urging the seat-back to fall forward, and a second tooth surface, in which a second side receives a rearward load for urging the seat-back to fall rearward, and
wherein the cut external teeth part of the pawl is provided on one side with respect to a radial line leading through the center of the external teeth, and
wherein a cutting degree of the cut external teeth part is different from a cutting degree of a normal external teeth part in the pawl.

7. The reclining apparatus according to claim 6, further comprising:
- a first cam, which is provided to a side opposite to the outer circumferential surface of the pawl; and
- a second cam, which is provided between the first cam and the pawl, wherein the first cam is configured to engage with a first side of the pawl with respect to a radial line leading through the center of external teeth to move the pawl to an unlocked position, and
wherein, when the second cam is pressed by the first cam, the second cam is configured to press a second side of the pawl with respect to the radial line such that the pawl is urged toward the guide so as to move in the direction, toward which the external teeth are engaged with the internal teeth.

8. The reclining apparatus according to claim 6, wherein a cutting degree of the first tooth surface and the second tooth surface of the cut external teeth part are different from each other.

9. The reclining apparatus according to claim 6, wherein a cutting degree of the first tooth surface and the second tooth surface of the cut external teeth part are set such that the second tooth surface has a higher engaging strength on the internal teeth than the first tooth surface.

* * * * *